Sept. 27, 1949.  F. J. SIGMUND ET AL  2,483,066
PROTECTING MEANS FOR ELECTRICAL WINDINGS
Filed April 30, 1945
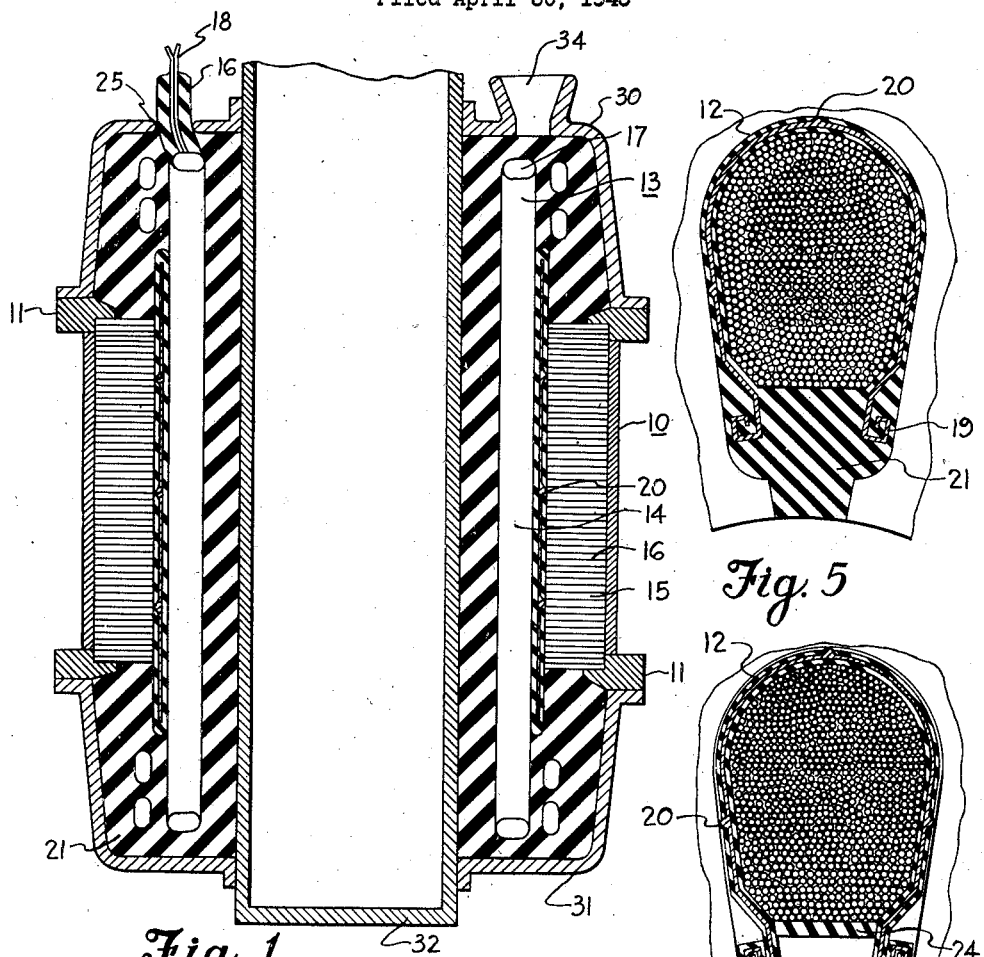
Fig. 1
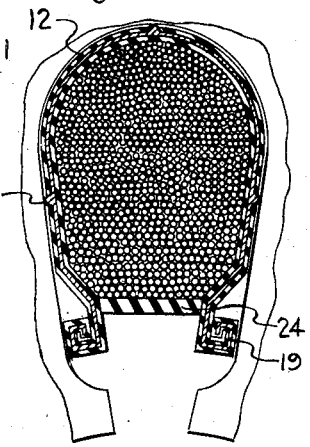
Fig. 5
Fig. 4
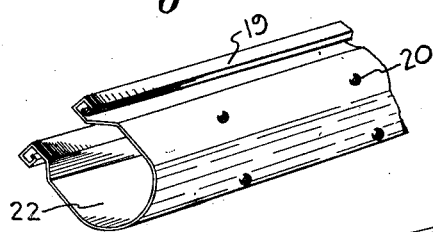
Fig. 2
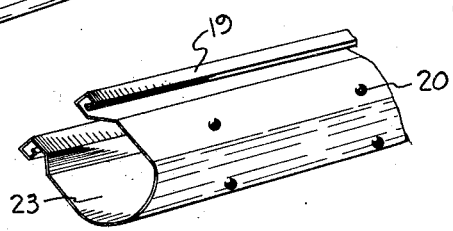
Fig. 3
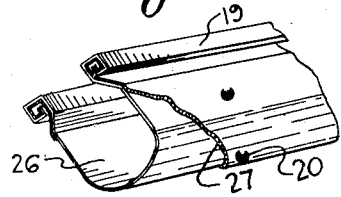
Fig. 6
INVENTORS
Frank J. Sigmund
William S. Hlavin
BY
Woodling and Krost
attys Patented Sept. 27, 1949

2,483,066

UNITED STATES PATENT OFFICE 2,483,066

PROTECTING MEANS FOR ELECTRICAL WINDINGS

Frank J. Sigmund and William S. Hlavin, Cleveland, Ohio, assignors to Sigmund Corporation, a corporation of Ohio Application April 30, 1945, Serial No. 591,082

12 Claims. (Cl. 171—252)

Our invention relates in general to winding elements for electric machines or devices and more particularly to fluid and moisture-proof winding elements which may be submersed in a fluid or operated at high speed and voltages in a highly humid atmosphere, and which will withstand a great deal of vibration without damage.

The term "fluid-proof" used herein and in the claims refers to complete exclusion of moisture and fluids. In short, a "fluid-proof" material would refer to a material which would neither transmit a fluid or moisture through pores or other openings, nor by hydroscopic capillary action.

An object of our invention is to completely exclude fluids and moisture from the windings of a dynamo-electric machine.

Another object of our invention is to provide a fluid-proof sleeve for the winding slots of a dynamo-electric machine or other devices.

Another object of our invention is to provide a fluid or moisture-proof sleeve for the winding slots of a dynamo-electric machine or other devices which takes up relatively little space of the slots and therefore allows more room for winding.

Another object of our invention is to provide a maximum amount of power in an electrical motor disposed to run under high humidity conditions or emersed in a fluid.

Another object of our invention is to provide a fluid or moisture-proof magnetizable core requiring relatively little hand assembly work to fluid or moisture-proof the windings of the core.

Another object of our invention is to provide an impermeable sleeve for the winding slots of a magnetizable core which sleeves are provided with spacing means thereon to space the sleeve from the wall of the core slots to permit a polymerizable and copolymerizable insulating material to envelope and provide support and cushion effect therefor.

Another object of our invention is to provide a ceramic sleeve for the winding slots of a magnetizable core which sleeves are reinforced and supported by a cushion of resilient polymerizable and copolymerizable material.

Another object of our invention is to provide a method for fluid and moisture-proofing the windings of a dynamo-electric machine which does not require degreasing of the parts after assembly and before applying a fluid and moisture-proof envelope material.

Another object of our invention is to provide a method of fluid and moisture-proofing the windings of an electric machine or device which does not require high pressure and temperature, and completely envelopes the windings without damaging or displacing same.

Other objects and a fuller understanding of our invention may be had by referring to the following description and claims, taken in conjunction with the accompanying drawing, in which:

Figure 1 is a cross-sectional view of a motor core and winding in a suitable casting mold with a lead-in cable extending to the exterior of the mold;

Figure 2 is a perspective of a glass core slot sleeve having a labyrinth formed longitudinal edge and illustrating the series of "hob nail" spacing means provided on the surface thereof;

Figure 3 is a perspective of a metallic core slot sleeve having a labyrinth formed on the longitudinal edge and illustrating the series of "hob nail" spacing means provided on the surface thereof;

Figure 4 is an end view of a sleeve of the type shown in the Figures 2 and 3 with a coating of material on the surface thereof as the sleeve appears in the core slots before casting;

Figure 5 illustrates the appearance of the sleeve of Figure 4 after casting; and Figure 6 is a perspective of a metallic sleeve having a series of "hob nail" spacing means provided on the surface thereof and coated with a layer of ceramic insulating material, the ceramic coating being broken away and exaggerated in thickness.

It is well known in the art of electric motor manufacture, that the current carrying windings of the motor must be completely protected against moisture and fluid in order to prevent electrical breakdown. This is true even though the magnetizable core of the machine, as well as other parts, may be completely saturated with moisture. There have been many attempts to fluid and moisture-proof the windings of a dynamo-electric machine including pressure molding of semi-plastic materials such as Bakelite, the provision of closed tubes inserted in the slots of the magnetizable core, and various other means. It has generally been found that injection or pressure molding of semi-plastic materials such as Bakelite requires a great deal of careful work and often results in an incomplete job of enclosing the winding. This difficulty is even more pronounced if the magnetizable core is to be left uncovered on the outside. Further, when high temperatures are required to thermally set the semi-plastic, the magnetizable core of the machine is expanded to a considerable degree. After the semi-plastic material is then set or cured, the magnetizable core shrinks back to its original room temperature size and thus produces a space between the magnetizable core and the thermally set plastics. This strain may be even so great as to produce cracks in the plastic. Further, under running conditions, the magnetizable core seldom even again reaches the temperature at which the semi-plastic material was thermally set, and therefore, the core never completely expands to fill the space existing between the coating and the core. It will readily be seen, then, that moisture and fluid might easily work in between the metal and the plastic and cause a breakdown in the windings unless an excessive mass of material completely encloses the magnetizable core on the outside thereof. Of course, providing a large mass of insulating material on the outside of the core prevents the ready escape of heat and produces an undesirable overheating.

Although tubes have been used to a considerable degree of success, much hand labor is needed to thread each individual winding wire through the tubes, and this procedure builds up a prohibitive cost of manufacture. Further, many different types of winding insulations consume a considerable amount of space in the slots and thereby reduces the number of windings which may be inserted in the coil slots. This reduction of coil windings in the slots is known as a reduction in the space factor of the machine. Further, as before indicated, insulation materials are generally not good as heat conductors, and therefore reduce the heat dissipation from the windings to the magnetizable core and hence to the surrounding atmosphere, which is the normal procedure of cooling electric motors.

The applicants have attempted to overcome these problems in the present application. With reference to the Figure 1 of the drawing we are illustrating our invention as being applied to the stator of a dynamo-electric machine during one stage of manufacture, although it is to be understood that our invention applies to the moisture and fluid-proofing of winding elements of all kinds. The Figure 1 illustrates a completed electric stator positioned in a suitable mold for receiving an envelope of insulating material. The stator of the dynamo-electric machine may comprise a magnetizable core 10, which is held together by suitable end rings 11. The magnetizable core is provided with a plurality of open slots 12 to receive the coil sides 14 of winding element 13. As an additional protection against moisture and cushion against mechanical shock, as well as insulation against unwanted eddy currents, the individual laminations 15 may be coated with a thin coating of insulating material 16 before the magnetizable core is assembled. As illustrated, the winding element 13 has coil heads 17 positioned at the ends of the magnetizable core 10. A terminal lead 18 extends from the coil head 17 and is arranged to be connected to a suitable source of supply.

Metal and ceramic materials such as glass, are materials which are well known for their non-hydroscopic or impermeable properties even in extremely thin sheets. In this application ceramic materials are defined as pertaining to any or all products made from earth by the agency of fire such as glass, enamels, and cement. However, the applicants refer only to ceramics which are non-hydroscopic and impermeable to the passage of moisture therethrough. Thus, ceramic materials which are porous, are never used. Glass of course, is the main material used, but glass is known in many forms and transparencies. That is, to the average layman, glass is a transparent material used for windows and the like, however, to the ceramic engineer there are many and varied types of glasses. Therefore, in order that the coil sides 14 may be as large as possible in cross-sectional area within the coil slots 12, a split sleeve of relatively thin dimension may be made from those materials and inserted in each of the coil slots prior to inserting the coil sides 14 therein. The split sleeves are preferably made of non-magnetizable material having the physical property of impermeability. That is, material which will remain impermeable to the passage of moisture even in extremely thin sheets. The sleeves are preferably made of this impermeable material in order that they may be made in relatively thin wall section and thereby not occupy a large amount of slot space. As illustrated in the Figure 2, a type of ceramic sleeve is illustrated with longitudinal edges 19 of the sleeve in the form of a labyrinth and having a series of projections 20 spaced along the outer surface thereof. This sleeve may then be coated on either side, or preferably on both sides, with a very thin coating of insulating material 16 as provided on the individual laminations. This insulating material 16 serves a twofold purpose of insulating the sleeve from the slot wall, and also providing a protective coating to the sleeve, whereby dirt and grease are kept off the sleeve surface during the winding operation of the motor. This coating material 16 is preferably formed of a material which is compatible with the material used to cast the final insulating envelope. That is, the coating 16 should be soluble in liquid insulating material 21 used as a main body insulating mass, or at least should be fusable therewith. However, the coating is not essential if the sleeves are cleaned and protected during assembly, whereby a good binding action can be obtained between the final cast material and the sleeves.

The Figure 3 illustrates a metallic sleeve similar in physical form to the ceramic sleeve of Figure 2, and being provided with a labyrinth edge 19 as well as the projections 20. The metallic and ceramic sleeves are thus interchangeable, and may be used in much the same way. The projections 20 are provided on both the sleeve 22 and the sleeve 23 to serve as spacing means to hold the sleeve away from the inner wall of the slot 12. Thus, a space is provided between the outside of the sleeves 22 or 23 and the inside surface of the slot walls. This space may be then filled by a fluid polymerizable or copolymerizable insulating material, and the polymerizable and copolymerizable material may thereafter be "set" into a resilient mass to support and cushion the sleeves. Thus, a thin resilient mass of material will be provided to support and cushion the sleeve in the coil slot, and thus prevent damage to the sleeve by vibration and shock. It has been found, for example, that ceramic glass sleeves, when positioned from the walls of the magnetizable core slots as described, and supported and cushioned by a polymerizable and copolymerizable rubber-like material, are able to withstand extreme shock of dropping as well as quick starting and stopping, without damage. In fact, the glass was found to be so well supported that direct physical blows by a blunt instrument were required to break the glass. In the case of metal sleeves, relatively thin wall sleeves are also supported against vibration and mechanical shock. The projections 20 are similar to the "hob-nail"

projections on glassware. They are provided for convenience in spacing the sleeves 22 or 23 from the slot walls in order that fluid insulating materials may be cast directly between the slot walls and the sleeves. However, although less desirable, the projection 20 could be omitted and a solid piece of pre-formed insulating material inserted between the slot walls and the sleeves to accomplish much the same effect. Or, the sleeves may be provided with a relatively thick coating of the insulating or cushioning material 16, before being placed into the coil slot. It is understood, however, that the use of the projection 20 is the preferred embodiment of my invention, and provides spacing means in order that fluid polymerizable and copolymerizable materials may be cast directly in place between the slot walls and the sleeves and provide a strong supporting and cushioning bond therebetween. The Figure 6 illustrates still another possibility comprising a metal sleeve 26 coated on at least one side with a thin coating of ceramic material 27. The coating in the Figure 6 is exaggerated for clearness of illustration. This combination gives to the sleeve 26 the strength of metal combined with the insulating properties of ceramics without the consumption of extra space in the coil slots.

After the sleeves are inserted in the core slot 12, the magnetizable core 10 may be wound in any suitable manner such as by inserting individual wires through the split of the metal sleeve, or by the use of pre-formed winding coils. In the latter case, the coil sides are merely separated and slipped into the core slots one at a time.

The terminal lead 18 is provided to supply power to the winding coil, and is covered with an insulating material 16 as provided on the lamination and sleeve surface. The insulating material 16, of course, is compatible with the fluid insulating material 21, or is at least fusable therewith. It will readily be understood, then, that the insulating material 16 will be dissolved and completely replaced by the material 21, or a completely fused area will result on the surface thereof and prevent moisture from entering between the insulating material 16 and the insulating material 21, and reaching the winding coils.

The word "compatible" as used herein connotes a material which is soluble in the same solvent used with the casting insulating material 21 and which will harden under the same conditions as the casting insulating material 21. In fact, the sleeves and the laminations may be given a coating of the actual material 21.

After the magnetizable core has been equipped with coated sleeves, wound, and inserted in the casting mold as hereinbefore described, the fluid casting material 21 is then used to completely fill all vacant space in and around all the coil heads, and to bridge and seal the splits of the sleeve 17, and will work its way into the space provided by the spacing means or projections 20 of the sleeves between the sleeves and the magnetizable core 10 as described. Suitable dams may first be inserted in the splits of the sleeve to prevent the fluid material 21 from filling the interstices of the windings if so desired. See part 24, Figure 4.

Although any suitable means may be employed to mold the assembled magnetizable core with the windings and sleeves therein, I illustrate a top mold 30 and a bottom mold 31 positioned on the ends of the magnetizable core 10, and a center mandril 32 located centrally of the magnetizable core and the mold end. The combination of magnetizable core, mold ends, and the center mandril provides a completely enclosed suitable casting mold into which a fluid insulating material may be poured. A pouring funnel 34 is provided on the mold top 30 for convenience in filling the assembled mold. Also, an opening 25 is provided for the terminal lead 18, and fits closely thereto. Although the illustration in Figure 1 shows a mold into which the castable material 21 is simply poured, we have found that a slightly better quality casting can be made by subjecting the mold to a slight vacuum during the filling process. When this material is poured into the mold in liquid condition, the solvent therein attacks the coating 16 on the sleeve, laminations, and terminal lead, and either completely dissolves it away, or softens it enough that a good fusion results after the material 21 is set or cured. Thus, the envelope coatings are sealed together, the first or primary coating of the sleeves and laminations being partially dissolved and fused with the material 21, or completely dissolved and replaced by the material 21. The material 21 then, as before described, also penetrates and fills all the space between the sleeves and the slot walls and either partly dissolves and fuses with the coating thereon, or completely dissolves and replaces the coating thereon. The provision of the insulating material 16 on the sleeves eliminates the necessity of the cleaning operations before mentioning and saves considerable time in manufacturing.

After filling the mold as described, the entire assembly may be placed in a warm atmosphere, such as an oven, and heated to a temperature substantially the same as a running or operating temperature of winding coils in use. A slightly improved casting can be accomplished by maintaining the entire assembly under a slight pressure during the heating period.

After the insulating material 21 has been solidified into a resilient mass, the magnetizable core with the winding sealed therein may be fitted with end bells and other suitable equipment to complete the building of a water-proof motor. The windings of this motor are completely enclosed in a fluid and moisture-proof envelope made up of a combination of insulating material and non-hydroscopic impermeable sleeves. The insulating material is thick in the places where there is no metal or ceramic sleeve, and thus prevents the entrance of moisture, and is exceedingly thin in the areas protected by the non-hydroscopic impermeable material, and therefore consumes but relatively small amounts of space in the slots. We have found that this type of moisture-proofing in electric motors reduces the space factor very little and the motor is able to operate completely submerged in water for indefinite periods of time without electrical breakdown.

Although we have described our invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

We claim as our invention:

1. In a dynamo-electric machine employing a magnetizable core having coil slots therein, windings with coil sides in said slots and coil heads at the ends of said core, the provision of split impermeable non-magnetic sleeves surrounding said coil sides in the coil slots and extending to the coil heads, said split impermeable non-magnetic sleeves being provided with spacing means extending from the outer surface thereof to contact the walls of the said coil slots and space the sleeve from the wall of the slot.

2. In a dynamo-electric machine employing a magnetizable core having coil slots therein, windings with coil sides in said slots and coil heads at the ends of said core, the provision of improved closure means to seal the coil sides against moisture, said improved closure means comprising split impermeable non-magnetic sleeves provided with spacing means on the outer surfaces thereof to contact the walls of the said coil slots and space the sleeves from the wall of the slots, said sleeves being formed with the cross-sectional contour of the edges of the sleeves describing labyrinths, and masses of fluid-proof insulating material surrounding said labyrinths edges and bridging the split in the sleeves and sealing the sleeves.

3. In a dynamo-electric machine comprising a magnetizable core with coil slots therein, windings with coil sides in said slots and coil heads at the ends of said core, the provision of improved means to make the windings moisture tight, said improved means comprising a coated impermeable ceramic sleeve in each slot and surrounding said coil sides, said coated sleeve comprising a nonmagnetic split impermeable ceramic sleeve having a plurality of projections extending from the outer surface thereof and spacing the ceramic sleeve from the slot wall, a coating of insulating material filling the space between the sleeve and the slot wall provided by the said projection, said insulating coating comprising a material which is fusable with a material of the class including polymerizable or copolymerizable insulating material, a mass of insulating material of the class including polymerizable and copolymerizable materials fused with the sleeve coating at least in the region of the sleeve split and bridging and sealing the sleeve split, and said mass terminating in an annular mass at the ends of the core and encasing the coil heads and fusing with the sleeve coating in the region of the sleeve ends, whereby a thick mass of material protects some parts of the coils from moisture and ceramic sleeves protect the remainder.

4. In a dynamo-electric machine comprising a magnetizable core with coil slots therein, the provision of an impermeable ceramic sleeve to house the coil sides in each coil slot, said sleeve being provided with projections thereon to contact the slot wall and space the sleeve from the wall of the slot, said spacing being filled with a polymerizable and copolymerizable material to support and cushion the ceramic sleeve.

5. In a dynamo-electric machine employing a magnetizable core having coil slots therein, the provision of glass sleeves to line said slots, said glass sleeves having spacing projections on the outer surface thereof to contact the walls of the slot and space the sleeve from the wall of the slot, said space being provided to permit a fluid polymerizable and copolymerizable material to be cast therein and thereafter to be polymerized and copolymerized into a resilient mass to support and cushion the glass sleeve.

6. In a dynamo-electric machine comprising a magnetizable core with coil slots therein, the provision of an impermeable metal sleeve to house the coil sides in each coil slot, said sleeve being provided with projections thereon to contact the slot wall and space the sleeve from the wall of the slot, said spacing being filled with a polymerizable and copolymerizable material to support and cushion the metal sleeve.

7. In a dynamo-electric machine employing a magnetizable core having coil slots therein, the provision of metal sleeves to line said slots, said metal sleeves having spacing projections on the outer surface thereof to contact the walls of the slot and space the sleeve from the wall of the slot, said space being provided to permit a fluid polymerizable and copolymerizable material to be cast therein and thereafter to be polymerized and copolymerized into a resilient mass to support and cushion the metal sleeve.

8. In a dynamo-electric machine comprising a magnetizable core with coil slots therein, windings with coil sides in said slots and coil heads at the ends of said core, the provision of improved means to make the windings moisture tight, said improved means comprising a coated impermeable metal sleeve in each slot and surrounding said coil sides, said coated sleeve comprising a nonmagnetic split impermeable metal sleeve having a plurality of projections extending from the outer surface thereof and spacing the metal sleeve from the slot wall, a coating of insulating material filling the space between the sleeve and the slot wall provided by the said projection, said insulating coating comprising a material which is fusable with a material of the class including polymerizable or copolymerizable insulating material, a mass of insulating material of the class including polymerizable and copolymerizable materials fused with the sleeve coating at least in the region of the sleeve split and bridging and sealing the sleeve split, and said mass terminating in an annular mass at the ends of the core and encasing the coil heads and fusing with the sleeve coating in the region of the sleeve ends, whereby a thick mass of material protects some parts of the coils from moisture and metal sleeves protect the remainder.

9. In a dynamo-electric machine employing a magnetizable core having coil slots therein, the provision of metal sleeves coated on at least one side thereof with a ceramic material, said sleeve serving to line said slots, said metal sleeves having spacing projections on the outer surface thereof to contact the walls of the slot and space the sleeve from the wall of the slot, said space being provided to permit a fluid polymerizable and copolymerizable material to be cast therein and thereafter to be polymerized and copolymerized into a resilient mass to support and cushion the metal sleeve.

10. In a dynamo-electric machine comprising a magnetizable core with coil slots therein, the provision of an impermeable sleeve to house the coil sides in each coil slot, said sleeve comprising metal and ceramic materials bonded together, and said sleeve being provided with projections thereon to contact the slot wall and space the sleeve from the wall of the slot, said spacing being filled with a polymerizable and copolymerizable material to support and cushion the constructed sleeve.

11. In a dynamo-electric machine employing a magnetizable core having coil slots therein, the provision of ceramic sleeves to line said slots, projection spacing means in each of said slots between the wall of said slots and said sleeve, said projection spacing means having a plurality of scattered projections to extend between the wall of the slot and said sleeve and space the sleeve from the wall of the slot.

12. In a dynamo-electric machine employing a magnetizable core having coil slots therein, windings with coil sides in said slots and coil heads at the ends of said core, the provision of split impermeable non-magnetic sleeves surrounding said coil sides in the coil slots and extending to the coil heads, projection spacing means in each of said slots between the wall of said slots and said sleeve, said projection spacing means having a plurality of scattered projections to extend between the wall of the slot and said sleeve and space the sleeve from the wall of the slot.

FRANK J. SIGMUND.
WILLIAM S. HLAVIN.

REFERENCES CITED

The following references are of record in the file of this patent:

UNITED STATES PATENTS

| Number | Name | Date |
|---|---|---|
| 1,962,267 | Blechschmidt | June 12, 1934 |
| 2,252,440 | Safford | Aug. 12, 1941 |
| 2,320,866 | Hill | June 1, 1943 |
| 2,385,385 | Sigmund | Sept. 25, 1945 |